United States Patent
Owens

(10) Patent No.: US 9,690,769 B2
(45) Date of Patent: Jun. 27, 2017

(54) METHOD AND SYSTEM FOR COMPLETING AN EDIT AREA OF A WEB PAGE

(75) Inventor: Stephen Owens, Marietta, GA (US)

(73) Assignee: EXCALIBUR IP, LLC, Sunnyvale, CA (US)

( * ) Notice: Subject to any disclaimer, the term of this patent is extended or adjusted under 35 U.S.C. 154(b) by 600 days.

(21) Appl. No.: 12/580,917

(22) Filed: Oct. 16, 2009

(65) Prior Publication Data

US 2011/0093789 A1 Apr. 21, 2011

(51) Int. Cl.
*G06F 3/00* (2006.01)
*G06F 17/24* (2006.01)
*G06F 17/30* (2006.01)

(52) U.S. Cl.
CPC ...... *G06F 17/243* (2013.01); *G06F 17/30861* (2013.01)

(58) Field of Classification Search
CPC . G06F 17/30864; G06F 3/0346; G06F 17/243
USPC .......................................... 715/700, 744–747
See application file for complete search history.

(56) References Cited

U.S. PATENT DOCUMENTS

| | | | |
|---|---|---|---|
| 5,796,393 A | 8/1998 | MacNaughton et al. | |
| 5,878,219 A | 3/1999 | Vance et al. | |
| 6,020,884 A | 2/2000 | MacNaughton et al. | |
| 6,300,947 B1* | 10/2001 | Kanevsky | 715/866 |
| 6,377,965 B1* | 4/2002 | Hachamovitch | G06F 17/276 715/203 |
| 6,421,717 B1* | 7/2002 | Kloba et al. | 709/219 |
| 7,216,292 B1 | 5/2007 | Snapper et al. | |
| 7,920,894 B2* | 4/2011 | Wyler | 455/552.1 |
| 8,120,590 B2* | 2/2012 | Lee | 345/173 |
| 8,130,668 B2* | 3/2012 | Agrawal | H04L 67/2828 370/252 |
| 8,321,802 B2* | 11/2012 | Rogers | G06F 3/04817 715/769 |
| 8,539,024 B2* | 9/2013 | Smit | G06F 17/276 709/203 |
| 8,631,009 B2* | 1/2014 | Lisa | G06F 17/30651 707/736 |
| 2004/0093376 A1* | 5/2004 | De Boor et al. | 709/203 |
| 2004/0224662 A1* | 11/2004 | O'Neil et al. | 455/408 |
| 2005/0131992 A1* | 6/2005 | Goldstein | G06F 3/0481 709/202 |
| 2006/0242109 A1* | 10/2006 | Pereira | G06F 17/276 |
| 2007/0150556 A1* | 6/2007 | Fukuda | G06F 17/3089 709/219 |
| 2008/0066020 A1* | 3/2008 | Boss et al. | 715/968 |
| 2008/0126983 A1* | 5/2008 | Keohane | G06F 17/276 715/810 |

(Continued)

*Primary Examiner* — Linh K Pham
(74) *Attorney, Agent, or Firm* — James J. DeCarlo; Greenberg Traurig

(57) ABSTRACT

Disclosed is a method and apparatus that detects an input focus proximate an edit area of a web page navigated to by a user of a computing device via a web browser. The edit area is configured to receive input in a particular format. The method also includes the step of displaying, on a display of the computing device, information associated with the user and maintained by a service provider, the displayed information having a format matching the particular format of input for the edit area of the web page. In one embodiment, the web page is associated with the service provider. In another embodiment, the web page is not associated with the service provider.

22 Claims, 4 Drawing Sheets

(56) References Cited

U.S. PATENT DOCUMENTS

| | | | |
|---|---|---|---|
| 2008/0313260 A1* | 12/2008 | Sweet | G06F 17/3089 709/201 |
| 2009/0089176 A1* | 4/2009 | McCabe | 705/26 |
| 2009/0089652 A1* | 4/2009 | Chi | G06F 17/30873 715/205 |
| 2009/0271713 A1* | 10/2009 | Stull | G06Q 10/10 715/753 |
| 2010/0223547 A1* | 9/2010 | Wilson et al. | 715/261 |
| 2010/0251143 A1* | 9/2010 | Thomas | G06F 17/3089 715/760 |
| 2010/0275109 A1* | 10/2010 | Morrill | G06F 17/2235 715/205 |
| 2010/0318894 A1* | 12/2010 | Billharz | G06F 17/24 715/234 |
| 2011/0055250 A1* | 3/2011 | Nandy | G06F 17/30554 707/769 |
| 2011/0078556 A1* | 3/2011 | Prasad | G06F 9/4443 715/234 |
| 2011/0117894 A1* | 5/2011 | Roundtree et al. | 455/414.1 |
| 2011/0213823 A1* | 9/2011 | Schmidt | G06F 15/16 709/202 |

* cited by examiner

METHOD AND SYSTEM FOR COMPLETING AN EDIT AREA OF A WEB PAGE

FIELD

The present disclosure relates to software, and more specifically to a method and system for completing an edit area of a web page.

BACKGROUND

Web pages often include one or more edit areas into which a user of the web page can enter (e.g., type) information. For example, a web page may consist of one or more input boxes into which a user can type an email address. As a specific example, a user can select to email an article displayed by a web page to a friend. Once the user makes this selection, a separate window may appear in which the user has to type in the email address of the user's friend to email the article to the friend.

Other examples of information that a user can enter into one or more edit areas besides an email address include an individual's first name, an individual's last name, a home address, a work address, a telephone number, a cell phone number, citizenship, credit card information, etc. This information may be required by one or more edit areas, such as on a web form. Typically, a user has to manually type in the information required by an edit area. Sometimes, such as on a web form, one or more previous inputs of the user may appear on the screen when the user begins to type into the edit area. These previous inputs are typically provided by the web page itself.

SUMMARY

In one aspect, a method includes the step of detecting, by a client-side module (e.g., a software toolbar) provided by a service provider and executing on a computing device, an input focus proximate an edit area of a web page navigated to by a user of the computing device via a web browser. The edit area is configured to receive input in a particular format. The method also includes the step of displaying, on a display of the computing device, information associated with the user and maintained by the service provider, the displayed information having a format matching the particular format of input for the edit area of the web page. In one embodiment, the web page is associated with the service provider. In another embodiment, the web page is not associated with the service provider.

Many types of information may be displayed by the client-side module. For example, in one embodiment the displaying of information includes displaying one or more email addresses associated with the user (e.g., an email address of the user, one or more email addresses in the user's address book maintained by the service provider, etc.). As another example, the displaying of information can include displaying contact information associated with the user (e.g., home or work addresses, citizenship, phone number(s), etc. of one or more individuals). As yet another example, the displaying of information can include displaying financial information associated with the user, such as credit card information, bank information, etc.

In one embodiment, the client-side module scans the web page to determine the location of each edit area of the web page. In one embodiment, the detecting of the input focus at the edit area includes providing, by the client-side module, software instructions to the web browser for execution by the web browser when displaying the web page, the software instructions for displaying a user interface for the displaying of the information.

In one embodiment, the computing device receives the client-side module over a network from a server computer of the service provider. In one embodiment, the computing device receives the information associated with the user from the server computer of the service provider. In one embodiment, the computing device includes a computing device storage (e.g., memory, a database, a hard drive, etc.) for storing the client-side module and/or the information.

These and other aspects and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Figure 1:
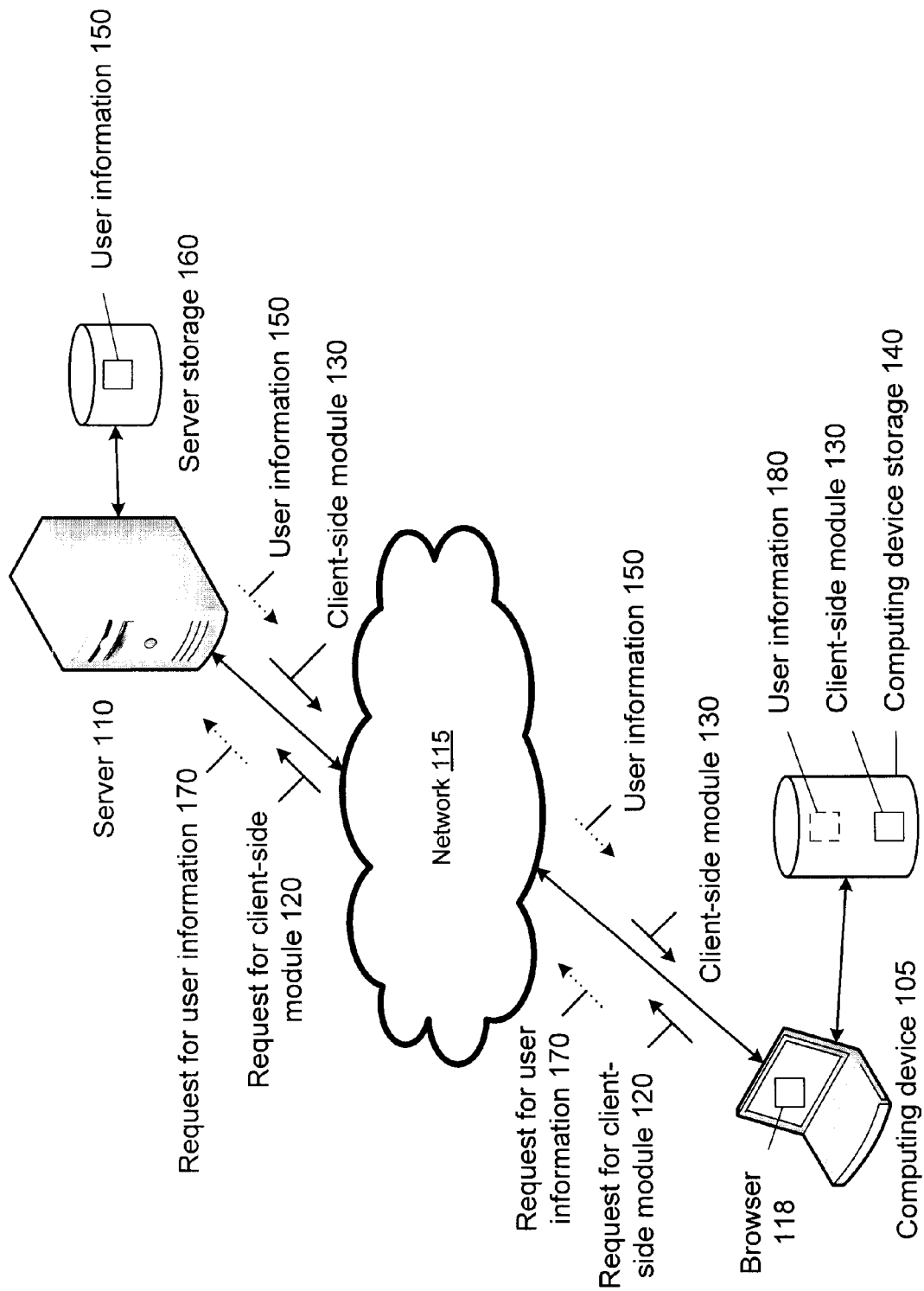
FIG. 1 is a block diagram of a computing device communicating with a server over a network in accordance with an embodiment of the present disclosure.

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Figure 2:
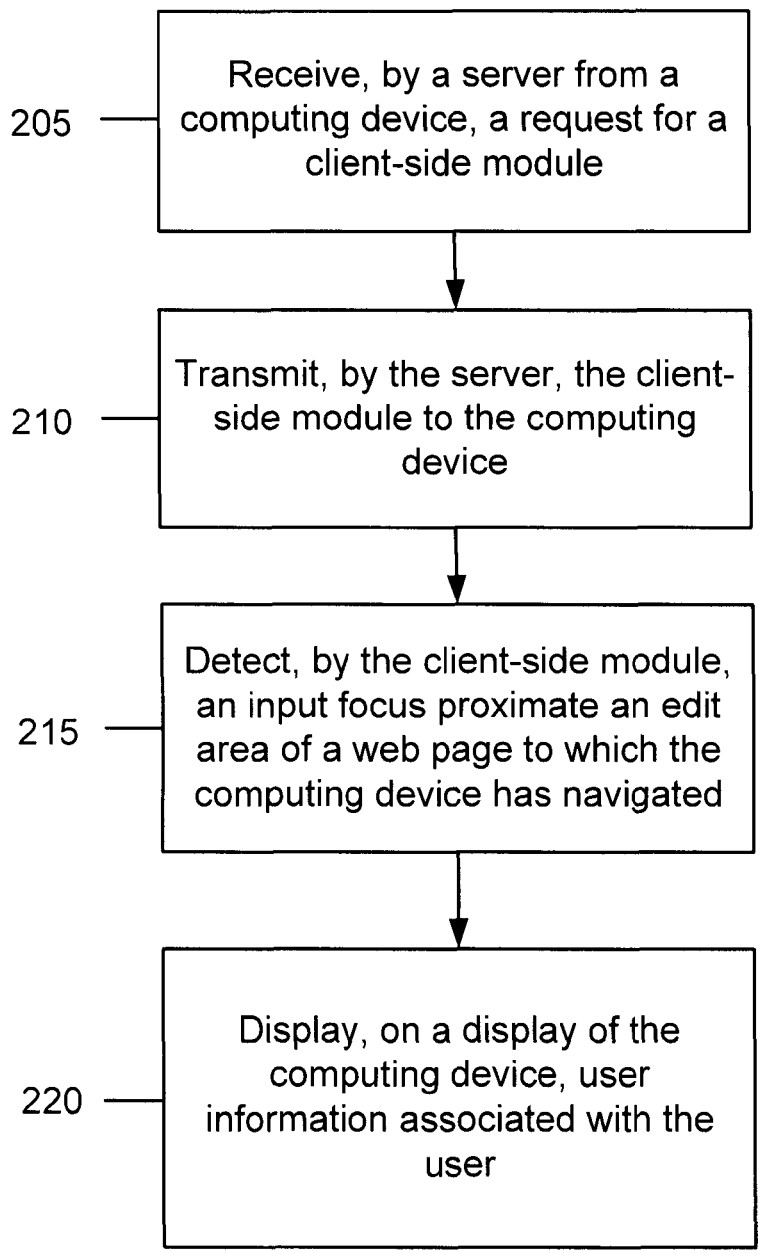
FIG. 2 is a flowchart illustrating the steps performed by the server and a client-side module of FIG. 1 in accordance with an embodiment of the present disclosure.

FIG. 1 is a block diagram of an embodiment of a computing device 105 communicating with a server 110 of a service provider over a network 115 such as the Internet. FIG. 2 is a flowchart showing an embodiment of steps performed by the server 110 and the computing device 105 to enable completion of one or more edit areas (e.g., edit boxes) of a web page. A user of the computing device 105 uses a web browser 118 executing on the computing device 105 to, for example, navigate to a web page of the service provider (e.g., Yahoo!'s home page—www.yahoo.com). In one embodiment, the user logs into (or creates) a user account with the service provider. In one embodiment, the server 110 receives a request for the user to log into the account and, if the login information is correct, logs the user into the user account.

In one embodiment, the computing device 105 transmits a request 120 to download a client-side module from the server 110. In one embodiment, the client-side module is a software toolbar. In another embodiment, the client-side module is a sidebar. The request 120 may occur automatically or may be in response to a user action. The server 110 receives the request 120 (step 205) and, in one embodiment, transmits client side module 130 over the network 115 to the computing device 105 (step 210). In one embodiment, the server 110 automatically transmits the client-side module 130 in response to the request 120. Alternatively, the server 110 can determine whether the client-side module 130 has already been transmitted to the computing device 105 and, if not, then transmits the client-side module 130. If the server 110 determines, after receiving request 120, that the client-side module 130 has already been transmitted to the computing device 105, the server 110 can, in one embodiment, ignore the request 120. In one embodiment, the server 110 transmits a new version of the client-side module 130 in response to receiving the request 120.

For purposes of this disclosure (and as described in more detail below with respect to FIG. 4), a computer or computing device such as the computing device 105 and/or server 110 includes a processor and memory for storing and executing program code, data and software which may also be tangibly stored or read from any type or variety of well known computer readable storage media such as magnetic or optical discs or RAM-discs or tape, by way of non-limiting example. Computers can be provided with operating systems that allow the execution of software applications in order to manipulate data. Personal computers, personal digital assistants (PDAs), wireless devices, cellular telephones, internet appliances, media players, home theater systems, servers, and media centers are several non-limiting examples of computing devices. The computing device 105 and the server 110 can, in one embodiment, also include a display, such as a screen or monitor. In one embodiment, the computing device 105 stores the client-side module 130 in a computing device storage 140. As described in more detail below with respect to FIG. 4, computing device storage 140 can include, for example, a memory (e.g., RAM, ROM, etc.), a hard drive, a database, etc.

After the client-side module 130 has been downloaded by the computing device 105, the user uses the browser 118 to navigate to a particular web page. In one embodiment, the web page is associated with the service provider. In another embodiment, the web page is not associated with the service provider.

In one embodiment, the client-side module 130 scans the web page to determine the location of each edit area of the web page. In one embodiment, the client-side module 130 scans the text on a web page to determine what type of input an edit area requires. For example, a web page typically has "To" or "From" or "Cc" or "Bcc" or "email address" next to or near an edit area into which a user is supposed to enter one or more email addresses. As another example, a web page typically has the phrase "phone number" next to or near an edit area into which a user is supposed to enter one or more telephone numbers. As yet another example, a web page typically has text including the phrase "Credit Card" next to or near an edit area into which a user is supposed to enter one or more credit card numbers.

In one embodiment, the user can select what is displayed. For example, the client-side module may display an icon that, when selected, enables a user to view different types of information that can be selected. The user can then select which type of information (e.g., email addresses, telephone numbers, etc.) is displayed. For example, if a user types the word "Dan" in an edit area, the user may see the following list:

'Dan Smith <dan@yahoo.com>'
100 Danword Lane, Marietta, Ga.

The user can then select whichever information made the most sense for the edit area.

In one embodiment, if the client-side module 130 does not recognize text displayed next to or near an edit area, the client-side module 130 communicates with the server 110 for additional information. In one embodiment, if the server 110 does not recognize text displayed next to or near an edit area, the server 110 can communicate to the client-side module 130 that no information should be displayed, that default information (e.g., an email address) should be displayed, or to request what type of information the user would like to have displayed.

In one embodiment, the client-side module 130 displays information based on what the user has typed into an edit area. For example, if a user types in a number into an edit area, the client-side module 130 can display telephone numbers. If the user continues to type numbers into the same edit area, the client-side module 130 may begin to display credit card numbers instead of telephone numbers.

In one embodiment, the client-side module 130 then detects an input focus proximate an edit area of the web page (step 215). In one embodiment, the client-side module 130 is attached to the browser 118 and monitors events that the browser 118 emits. In one embodiment, the client-side module 130 detects input focus by catching a 'focus' event and then determines that the element receiving focus is an edit control. As used herein, an input focus indicates the edit area of the graphical user interface of the web page which is currently selected to receive input. For example, text entered at the keyboard or pasted from a clipboard is sent to the edit area which currently has the input focus. Typically, the input focus is withdrawn from an edit area by giving another edit area of the web page the input focus. Thus, the input focus is similar to a cursor in a text-based environment. When considering a graphical interface, the mouse cursor is also involved and, as such, moving the mouse will typically move the mouse cursor without changing the input focus. The input focus can typically be changed by clicking on an edit area that can receive focus with the mouse. As used herein, an edit area can be any area of a web page in which a user can enter (e.g., type) information. Each edit area (e.g., rectangle or box) is configured to receive input in a particular format. For example, an edit area may be an area of the web page that enables a user to email the web page to one or more email addresses. The format of the input accepted by this edit area is the format of an email address. Another example of an edit area may be an area of a web page that enables a user to input his or her credit card number. The format of the input accepted by this edit area is typically a sixteen digit number. Yet another example of an edit area may be an area of a web page that enables a user to input his or her name. The format of the input accepted by this edit area is one or more characters.

When the client-side module 130 detects that an input focus is proximate (e.g., at, in, or near) an edit area of the web page, information associated with the user that is appropriate for the edit area is displayed by the client-side module 130 so that the user can select one or more of the displayed choices. In one embodiment, the information that is displayed is information obtained from the user's contacts associated with the user's account. In one embodiment, the information is displayed as soon as the input focus is proximate an edit area of the web page. Alternatively, the information can be displayed when the input focus is proximate an edit area of the web page and the user has started typing into the edit area. Thus, the client-side module 130 can auto-complete information input into an edit area of the web page.

For example, suppose a web page that a user of the computing device 105 has navigated to is a news article. The user decides to email this web page to a friend. Further suppose that the web page itself has an edit area configured to accept one or more email addresses to which the news article can be emailed (or, in another embodiment, the web page may open up another window that contains an edit area which is configured to accept one or more email addresses to which the news article can be emailed). In one embodiment, the client-side module 130 displays one or more email addresses associated with the user account with the service provider so that the user can select the friend's email address from a displayed list of email addresses rather than having to manually type in the friend's email address.

In one embodiment, the server 110 maintains and stores user information 150 associated with the user account in server storage 160 (e.g., a memory, a hard drive, a database, etc.). In one embodiment, when the client-side module 130 detects an input focus proximate to an edit area of the web page, the client-side module 130 transmits a request 170 for user information 150 to the server 110. In one embodiment, the server 110 transmits a portion of or all of the user information 150 stored in the server storage 160 to the computing device 105. The computing device 105 then displays, on a display of the computing device 105, some or all of the transmitted user information 150 (step 220). In one embodiment, the computing device 105 stores the transmitted user information 150 in the computing device storage 140.

In one embodiment, the server 110 transmits the user information 150 associated with the user account to the computing device 105 at a predetermined time or time(s) (which, in one embodiment, is not related to the detection step by the client-side module 130). For example, the server 110 can transmit the user information 150 to the computing device 105 at the same time as when the server 110 transmits the client-side module 130 to the computing device 105, after transmitting the client-side module 130 to the computing device 105, each time the user logs into the user account maintained by the server 110, periodically, or any other time or times. In one embodiment, when the client-side module 130 detects an input focus proximate an edit area of the web page, the client-side module 130 can retrieve user information 180 stored in the computing device storage 140 for display (step 220).

The user information associated with the user account may be contact information associated with the user (e.g., the user's first name, the user's last name, the user's home address, the user's work address, the user's telephone number, the user's cell phone number, the user's citizenship, a friend's first name, the friend's last name, the friend's home address, the friend's work address, the friend's telephone number, the friend's cell phone number, the friend's citizenship, etc.), financial information (e.g., credit card information, bank information, etc.), passwords, or any other information associated with the user.

As a non-limiting example, in one embodiment the client-side module 130 (e.g., toolbar) synchronizes browser Document Object Model (DOM) events and detects when the user has set the input focus to an edit area (which is typically referred to as a set-focus event). Upon handling the set-focus event, the client-side module 130 provides software instructions (e.g., a script, such as Javascript instructions) for the browser to execute at or near the time of displaying the web page. In one embodiment, the software instructions relate to a user interface to be displayed when the set-focus event occurs. This user interface may be an icon, a display area, etc.

For example, the client-side module 130 can provide one or more of the following software instructions to the browser 118:

Set 1: instructions for performing auto-complete on an edit area

Set 2: instructions that contain a data structure housing the current user information Set 3: instructions specifying which edit area should receive the attention of the auto-complete instructions In one embodiment, one or more software instructions described above is executed by the browser 118 calling the script IHTMLWindow::exec_Script( ). Further, if the user changes input focus to a different edit area, in one embodiment the client-side module 130 provides the instructions of Set 3 again, thereby specifying the new edit area on which to focus.

Figure 3:
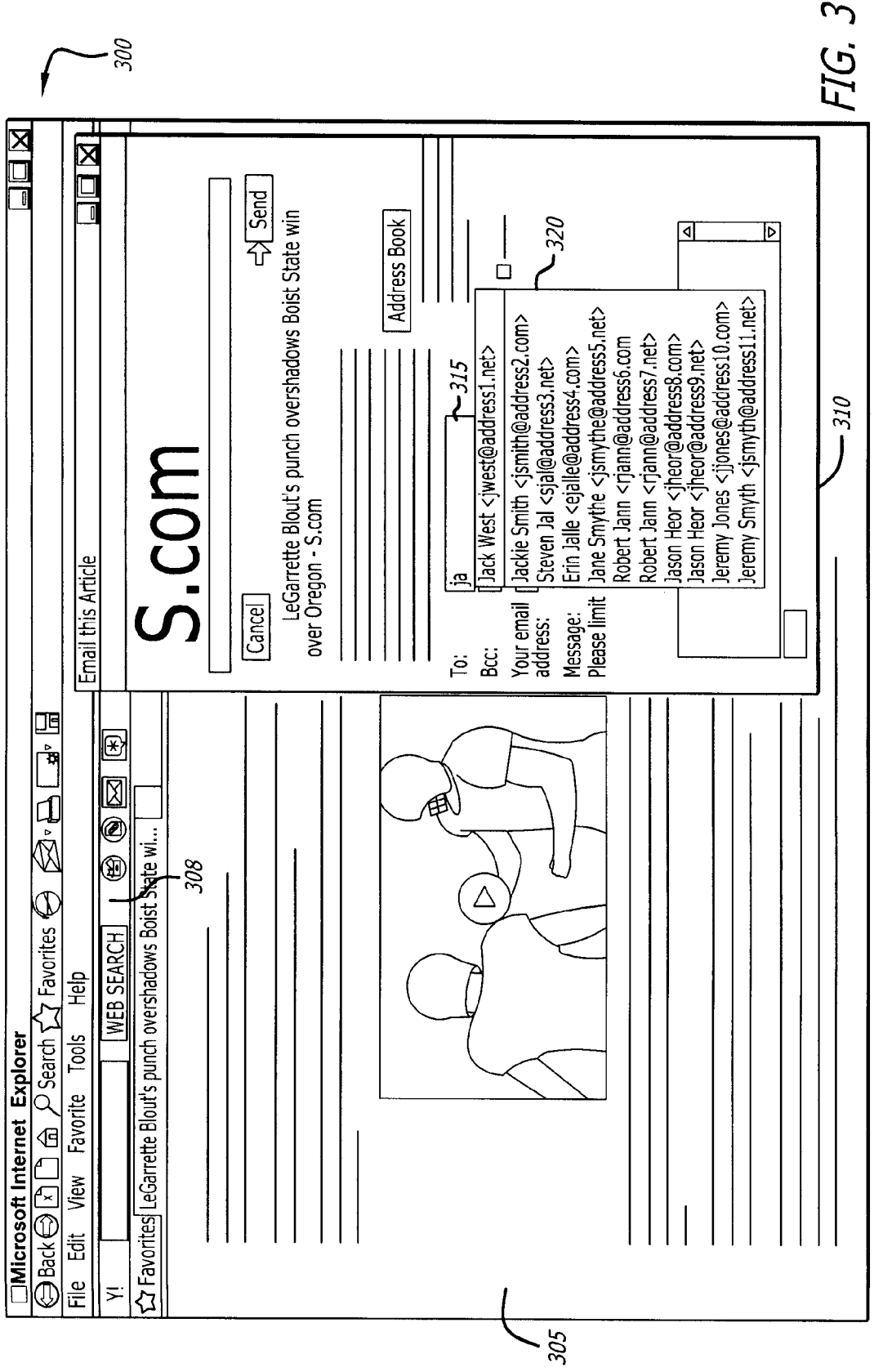
FIG. 3 is an example of a screen shot of a web page to which the computing device of FIG. 1 has navigated in accordance with an embodiment of the present disclosure.

FIG. 3 is a screen shot of an embodiment of a web page 300 to which the user of the computing device 105 has navigated. The left side of the screen shot is an article 305 displayed by the web page 300. The client-side module is shown in FIG. 3 as toolbar 308. The user has selected (e.g., by clicking on a button displayed by the web page 300) to email this article 305 to a friend. As a result of the user's selection to email this article to a friend, a second window 310 is displayed. As shown, the user has started typing an email address into an edit area 315. As a result of this typing, an autocomplete information display area 320 containing email addresses is displayed below the edit area 315. In one embodiment, the email addresses displayed by the autocomplete information display area 320 are email addresses that have been previously stored by the user (e.g., as part of the user's address book that is maintained at the server 110 by the service provider and that is retrieved either from the server storage 160 and/or from the computing device storage 140). In one embodiment, the autocomplete information is displayed when a user hovers over an edit area and/or when the user selects the edit area.

Further, in one embodiment, the autocomplete information display area 320 is not immediately displayed when a user begins typing in the edit area 315 (or when the input focus is proximate the edit area 315). Instead, in one embodiment, the client-side module 130 displays an icon next to the edit area 315 that the user can then select in order to display the autocomplete information display area 320. For example, if the web page 300 itself has an autocomplete feature and therefore provides autocomplete information when a user types in or selects the edit area 315, and this information is displayed below the edit area 315, the client-side module 130 can display an icon next to the edit area 315 so that the client-side module's autocomplete information does not interfere with the web page's autocomplete information. In one embodiment, the autocomplete information display area 320 associated with the client-side module 130 can also be displayed not directly under the edit area 315 but next to the edit area 315, so that the user can easily determine his or her choices without any interference between different autocomplete information.

Figure 4:
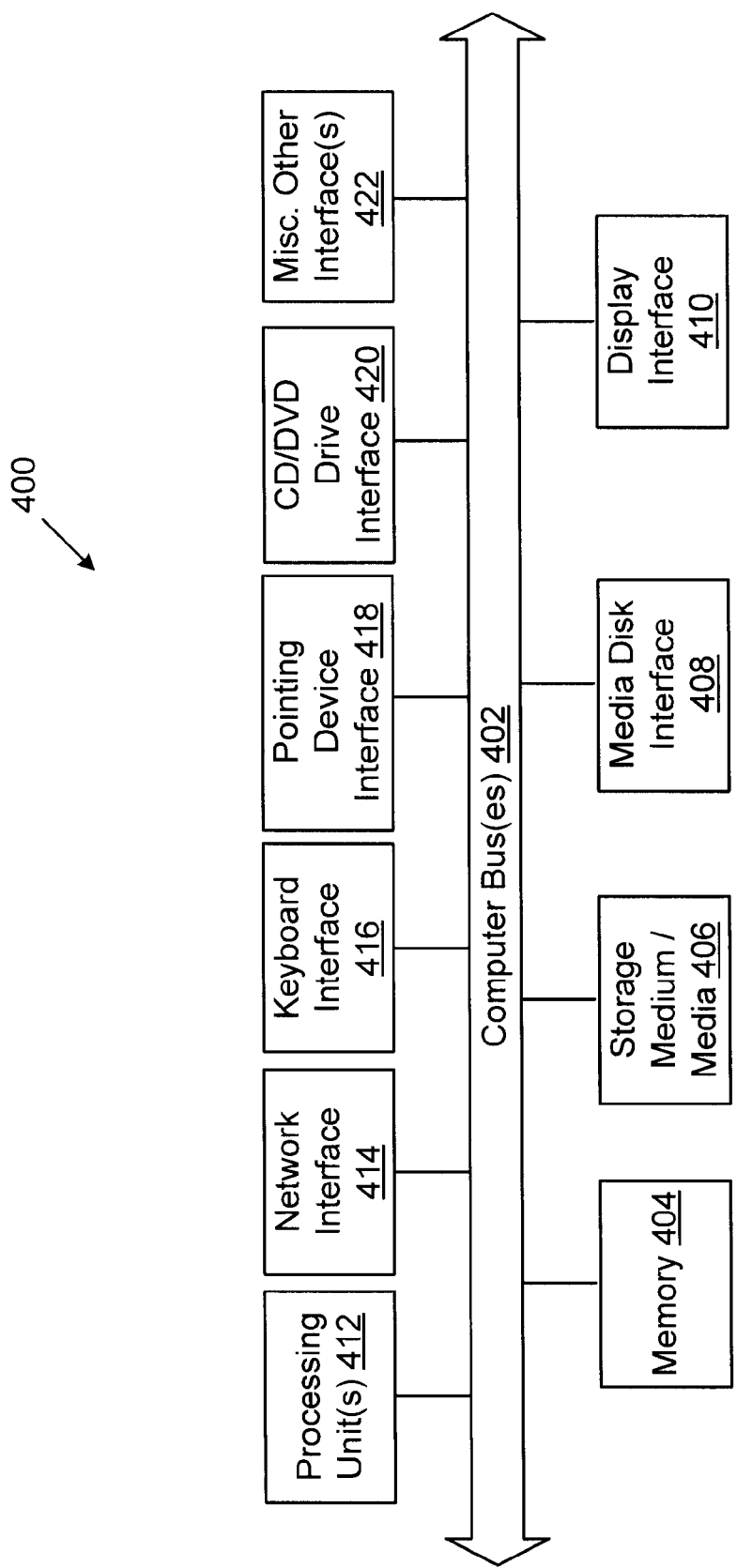
FIG. 4 is a block diagram illustrating an internal architecture of a computing device in accordance with an embodiment of the present disclosure.

FIG. 4 is a block diagram illustrating an internal architecture of an example of a computing device, such as server 110 and/or computing device 105, in accordance with one or more embodiments of the present disclosure. As shown in FIG. 4, internal architecture 400 includes one or more processing units (also referred to herein as CPUs) 412, which interface with at least one computer bus 402. Also interfacing with computer bus 402 are persistent storage medium/media 406, network interface 414, memory 404, e.g., random access memory (RAM), run-time transient memory, read only memory (ROM), etc., media disk drive interface 408 as an interface for a drive that can read and/or write to media including removable media such as floppy, CD-ROM, DVD, etc. media, display interface 410 as interface for a monitor or other display device, keyboard interface 416 as interface for a keyboard, pointing device interface 418 as an interface for a mouse or other pointing device, and miscellaneous other interfaces not shown individually, such as parallel and serial port interfaces, a universal serial bus (USB) interface, and the like.

Memory 404 interfaces with computer bus 402 so as to provide information stored in memory 404 to CPU 412 during execution of software programs such as an operating system, application programs, device drivers, and software modules that comprise program code, and/or computer-executable process steps, incorporating functionality described herein, e.g., one or more of process flows described herein. CPU 412 first loads computer-executable process steps from storage, e.g., memory 404, storage medium/media 406, removable media drive, and/or other storage device. CPU 412 can then execute the stored process steps in order to execute the loaded computer-executable process steps. Stored data, e.g., data stored by a storage device, can be accessed by CPU 412 during the execution of computer-executable process steps.

Persistent storage medium/media 406 is a computer readable storage medium(s) that can be used to store software and data, e.g., an operating system and one or more application programs. Persistent storage medium/media 406 can also be used to store device drivers, such as one or more of a digital camera driver, monitor driver, printer driver, scanner driver, or other device drivers, web pages, content files, playlists and other files. Persistent storage medium/media 406 can further include program modules and data files used to implement one or more embodiments of the present disclosure.

For the purposes of this disclosure a computer readable storage medium stores computer data, which data can include computer program code executable by a computer, in machine readable form. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
receiving, by a computing device, a client-side module and user information provided by a service provider;
receiving, by the computing device from a user, a request to navigate to a web page;
navigating, by the computing device, to the web page via a web browser;
scanning, by the client-side module, the web page to determine a location of each edit area of the web page;
scanning, by the client-side module, text on the web page to determine what type of input each edit area requires;
detecting, by the client-side module, an input focus proximate a detected edit area of the web page, the detected edit area configured to receive input in a particular format, the particular format of the input for the detected edit area being a scanned type of input required for the detected edit area, the client-side module synchronizing browser Document Object Model (DOM) events to detect when the user has set the input focus proximate the detected edit area; and
in response to the detecting, displaying, by the client-side module and on a display of the computing device, the user information associated with the user and maintained by the service provider, the displayed information not specifically associated with a web form and having a format matching the particular format of input for the detected edit area of the web page.

2. The method of claim 1 wherein the navigating to a web page further comprises navigating to a web page not associated with the service provider.

3. The method of claim 1 wherein the navigating to a web page further comprises navigating to a web page associated with the service provider.

4. The method of claim 1 wherein the displaying of information further comprises displaying one or more email addresses associated with the user.

5. The method of claim 1 wherein the displaying of information further comprises displaying contact information associated with the user.

6. The method of claim 1 wherein the displaying of information further comprises displaying financial information associated with the user.

7. The method of claim 1 wherein the client-side module is a software toolbar.

8. The method of claim 1 wherein the detecting of the input focus at the edit area further comprises providing, by the client-side module, software instructions to the web browser for execution by the web browser when displaying the web page, the software instructions for displaying a user interface for the displaying of the information.

9. The method of claim 1 further comprising receiving, by the computing device over a network from a server computer of the service provider, the information associated with the user.

10. The method of claim 9 further comprising storing, in a memory of the computing device, the information.

11. A computing device comprising:
a processor;
a client-side module provided by a service provider, executed by the processor, and configured to scan a web page navigated to by a user of the computing device via a web browser for an edit area, scan text on the web page to determine what type of input each edit area requires, and detect an input focus proximate the edit area of the web page, the edit area configured to receive input in a particular format, the particular format of the input for the edit area being a scanned type of input required for the edit area, the client-side module synchronizing browser Document Object Model (DOM) events to detect when the user has set the input focus proximate the detected edit area; and
a display in communication with the client-side module and configured to display information associated with the user and maintained by the service provider, the displayed information not specifically associated with a web form and having a format matching the particular format of input for the edit area of the web page.

12. The computing device of claim 11 wherein the web page is not associated with the service provider.

13. The computing device of claim 11 wherein the web page is associated with the service provider.

14. The computing device of claim 11 wherein the information associated with the user further comprises email addresses associated with the user.

15. The computing device of claim 11 wherein the information associated with the user further comprises contact information associated with the user.

16. The computing device of claim 11 wherein the information associated with the user further comprises financial information associated with the user.

17. The computing device of claim 11 wherein the client-side module is a software toolbar.

18. The computing device of claim 11 further comprising a computing device storage configured to store the client-side module.

19. The computing device of claim 11 further comprising a computing device storage configured to store the information associated with the user.

20. The computing device of claim 11 wherein the client-side module is further configured to provide software instructions to the web browser for execution by the web browser when displaying the web page, the software instructions for displaying a user interface for the displaying of the information.

21. A non-transitory computer readable storage medium storing computer program instructions capable of being executed by a computer processor, the computer program instructions defining the steps of:
scanning, by a client-side module provided by a service provider and executing on a computing device, a web page navigated to by a user of the computing device via a web browser for each edit area of the web page;
scanning, by the client-side module, text on the web page to determine what type of input each edit area requires;
detecting, by the client-side module, an input focus proximate a detected edit area of the web page, the edit area configured to receive input in a particular format, the particular format of the input for the detected edit area being a scanned type of input required for the detected edit area, the client-side module synchronizing browser Document Object Model (DOM) events to detect when the user has set the input focus proximate the detected edit area; and
displaying, on a display of the computing device, information associated with the user and maintained by the service provider, the displayed information not specifically associated with a web form and having a format matching the particular format of input for the edit area of the web page.

22. A method comprising:
receiving, by a server computer of a service provider from a computing device, a request for a client-side module;
transmitting, by the server computer to the computing device, the client-side module, the client-side module configured to:
scan a web page navigated to by a user of the computing device via a web browser to determine a location of each edit area of the web page;
scan text on the web page to determine what type of input each edit area requires;
detect an input focus proximate a detected edit area of the web page, the edit area configured to receive input in a particular format, the particular format of the input for the detected edit area being a scanned type of input required for the detected edit area, the client-side module synchronizing browser Document Object Model (DOM) events to detect when the user has set the input focus proximate the detected edit area; and
display, on a display of the computing device, information associated with the user and maintained by the service provider, the displayed information not specifically associated with a web form and having a format matching the particular format of input for the edit area of the web page.

\* \* \* \* \*